United States Patent
Tormasov et al.

(10) Patent No.: US 8,938,723 B1
(45) Date of Patent: Jan. 20, 2015

(54) USE OF GPU FOR SUPPORT AND ACCELERATION OF VIRTUAL MACHINES AND VIRTUAL ENVIRONMENTS

(75) Inventors: Alexander G. Tormasov, Moscow (RU); Maxim A. Kuzkin, Moscow (RU); Kirill S. Korotaev, Moscow (RU)

(73) Assignee: Parallels IP Holdings GmbH, Schaffhausen (CH)

( * ) Notice: Subject to any disclaimer, the term of this patent is extended or adjusted under 35 U.S.C. 154(b) by 764 days.

(21) Appl. No.: 12/849,689

(22) Filed: Aug. 3, 2010

Related U.S. Application Data

(60) Provisional application No. 61/230,943, filed on Aug. 3, 2009.

(51) Int. Cl.
*G06F 9/45* (2006.01)

(52) U.S. Cl.
USPC .......................................... 717/136; 717/141

(58) Field of Classification Search
None
See application file for complete search history.

(56) References Cited

U.S. PATENT DOCUMENTS 8,200,796 B1 * 6/2012 Margulis ...................... 709/223

* cited by examiner

*Primary Examiner* — Qamrun Nahar
(74) *Attorney, Agent, or Firm* — Bardmesser Law Group

(57) ABSTRACT

A system, method and computer program product for a system, method and computer program product for using a GPU of a host computer system for supporting functionality of a number of VMs implemented on the host computer system. The GPU usage by a VM includes e.g., sharing a video card with a VM hypervisor; executing applications controlled by the hypervisor; optimization of a snapshot memory consumption; CRC calculations for memory ballooning; on-the-fly disk data encryption; indexing disk data; efficient data compression for HDD; compression of the VM execution trace data and video traffic; computations for backup storage; AV scanning; firewall-related services; traffic encryption (IPSec); processing and restoration of disk transactions; optimization of incremental backups (creation and comparison of snapshots); traffic indexing and replay; isolating some applications on the GPU for virus protection; optimization of runtime compilers.

18 Claims, 4 Drawing Sheets

USE OF GPU FOR SUPPORT AND ACCELERATION OF VIRTUAL MACHINES AND VIRTUAL ENVIRONMENTS

CROSS-REFERENCE TO RELATED APPLICATION

This application is a non-provisional application of U.S. Provisional Patent Application No. 61/230,943, filed Aug. 3, 2009, entitled USE OF GPU FOR SUPPORT AND ACCELERATION OF VIRTUAL MACHINES AND ENVIRONMENTS, which is incorporated by reference herein in its entirety.

BACKGROUND OF THE INVENTION

1. Field of the Invention

The present invention is related to virtualization technology, and more particularly, to using a GPU for support and acceleration of Virtual Machines (VMs).

2. Description of the Related Art

The industry trend of virtualization and isolation of computer system resources presents two major challenges—virtualization at a software level and virtualization at a hardware level. A Virtual Machine (VM) is a type of an isolated Virtual Environment where multiple VMs can run on the same physical machine simultaneously. Each VM instance has a set of its own software components and uses hardware modules of the physical machine where the VM resides.

Typically, there are multiple VMs created on a host operating system. In such system, some resources of the host operating system can be isolated and allocated for running each of the VMs. An example of this type of system is a computing environment provided by VMware™. The VMware™ solution provides standardized isolated secured computing environments. This product is typically used as an enterprise-level solution, where a number of VMware™ Virtual Machines are distributed throughout the computer system. However, the VMware™ solution does not provide adequate support for using system hardware for support and acceleration of the VMs.

Virtualization allows running a number of VMs on the same physical machine. Examples of conventional virtualization solutions are virtual systems by VMware™, Parallels Software International, Inc., Microsoft Virtual Server, Microsoft/Citrix Terminal Server, Virtuozzo™ by SWSoft (Parallels), Xen systems by XenSource, Solaris Zones, etc. All of these systems, however, provide only limited support for a low level (i.e., hardware) virtualization.

With Virtual Machine (VM) technology, a user can create and run multiple virtual environments on a physical server at the same time. Each virtual environment (such as a VM), requires its own operating system (OS) and can run applications independently. The VM software provides a layer between the computing, storage, and networking hardware and the software that runs on it.

A Virtual Machine technology requires employing hardware of a real physical machine or a processor for support of a VM. A hardware element that is increasingly used for acceleration of physical machines is a Graphic Processing Unit (GPU). General-purpose computing on graphics processing units (GPGPU, also referred to as GPGP) is a technique of employing the GPU, which typically handles only computations related to computer graphics, for performing computations for other applications traditionally handled by the CPU.

The addition of programmable stages and higher precision arithmetic functionality to rendering pipelines allows software developers to use stream processing on non-graphical data. Traditionally, GPU functionality has been very limited. In fact, for many years, the GPU was only used to accelerate certain parts of the graphics pipeline. Some improvements in GPU programmability have been recently made so that the GPUs can be used for supporting different type of non-graphical applications.

However, the GPUs are only used for supporting the applications running on physical machines. The GPU typically supports only one operating system of the physical computer. Virtualization allows running a number of VMs on a physical machine. Each of the VMs needs acceleration and support of a single GPU.

Therefore, it is desirable to use a GPU for supporting and accelerating a number of the VMs running on a physical machine. Accordingly, there is a need in the art for a system and method that addresses the need for employing the GPU for support and acceleration of the VMs.

SUMMARY OF THE INVENTION

The present invention is intended as a method and system for using a GPU for support and acceleration of Virtual Machines (VMs) that substantially obviates one or several of the disadvantages of the related art.

In one aspect of the invention, there is provided a system, method and computer program product for using a GPU of a host computer system for supporting functionality of a number of VMs implemented on the host computer system. According to an exemplary embodiment, the GPU usage by a VM can include: sharing a video card with a VM hypervisor; executing applications controlled by the hypervisor; optimization of a snapshot memory consumption; CRC calculations for memory ballooning; on-the-fly disk data encryption; indexing disk data; efficient data compression for HDD; compression of the VM execution trace data and video traffic; computations for backup storage; AV scanning; firewall-related services; traffic encryption (IPSec); processing and restoration of disk transactions; optimization of incremental backups (creation and comparison of snapshots); traffic indexing and replay; isolating some applications on the GPU for virus protection; optimization of runtime compilers or interpreters, and many others.

In one embodiment, source code .Net, Python or Java code that needs to be executed is launched in the VM or in a container placed on the GPU. Secure or optimized object code or other appropriate results of code execution, compilation or interpretation are then transmitted to the host or guest OS(es) of the main computing system, which uses the main CPU. The code (or portions thereof) is off-loaded to the GPU based on CPU load and on a number of VMM exist triggered by execution of the code. The code that triggers VMM exist (i.e., exceptions and interrupts) cannot be efficiently processed on the GPU.

According to another exemplary embodiment, the computationally intensive VM operations are detected by a VMM (virtual machine monitor) and off-loaded to the host system GPU, and the host system CPU is advantageously freed up. Also, when the VMM does not detect anything, it can use the GPU for its own optimization, such as hash calculations for RAM sharing.

In yet another embodiment, a system for employing a GPU in a virtual environment includes a CPU, a GPU coupled to the CPU, and a memory coupled to the CPU. A Virtual Machine Monitor (VMM) has virtualization means and supporting a Virtual Machine (VM) implemented on the computer system. At least one software application is running within the VM, and at least a part of the means for supporting virtualization related to the VMM functionality is executed on the GPU and results of the execution are used by the VMM. The code (or optionally, the source code) of the means for supporting virtualization is translated for GPU execution. The source code of the means for supporting virtualization is translated for execution on the GPU. The means for supporting virtualization executable code on the CPU contains GPU-executable code. The VMM translates the code of the means for supporting virtualization for GPU execution. Alternatively, the VMM translates source code of the means for supporting virtualization to the GPU specific code.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and, together with the description, serve to explain the principles of the invention.

DETAILED DESCRIPTION OF THE PREFERRED EMBODIMENTS

Figure 1:
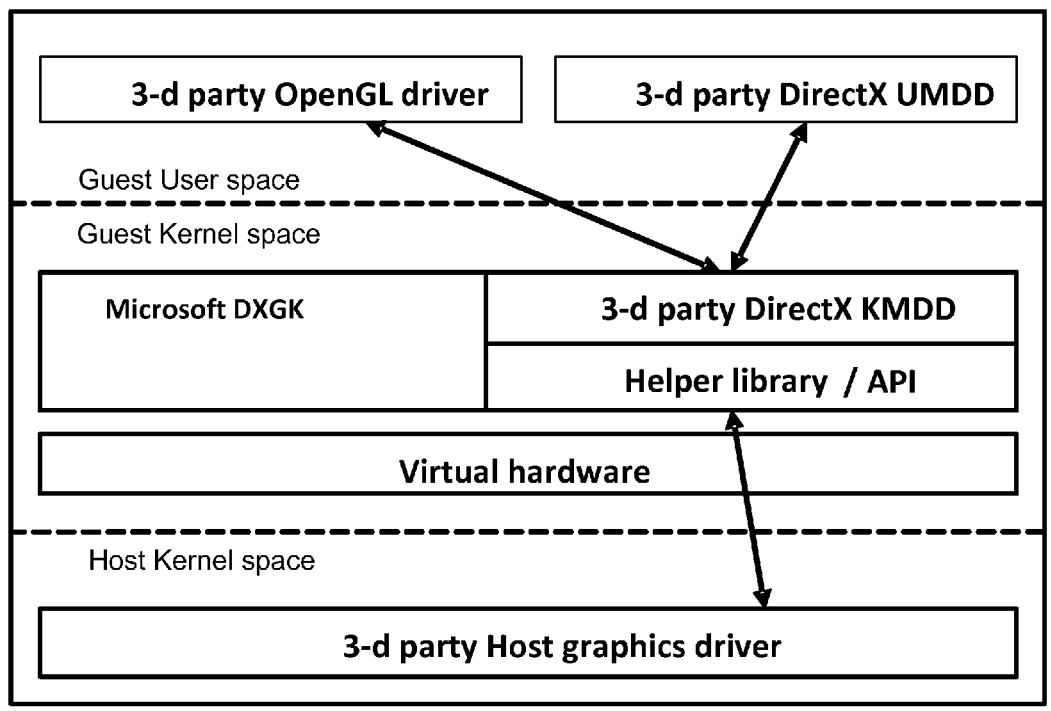
FIG. 1 illustrates a system architecture that provides communication channel between a guest system and a host system, in accordance with an exemplary embodiment.

Reference will now be made in detail to the preferred embodiments of the present invention, examples of which are illustrated in the accompanying drawings.

In one aspect of the invention, there is provided a system, method and computer program product for employing a host computer system GPU for support and acceleration of Virtual Machines (VMs) implemented on the host computer system.

According to the exemplary embodiment, the computationally intensive VM operations (such as, for example, address translations) are detected by the VMM. Then, these operations are translated into a format suitable for the GPU and are off-loaded to the host system GPU. In one embodiment, a special VM can be dedicated for providing services to other VMs. In this case, the computation performed by the dedicated VM are detected by the VMM and translated for processing on the GPU. The VMM detects or identifies computationally intensive tasks performed on the VM and, where suitable, off-loads them to the GPU.

According to the exemplary embodiment, only some of the GPU processors are dedicated for each of the VMs. Thus, the entire GPU is not occupied by just one process (such as processing graphics for a computer system) and a number of the VM processes are executed in parallel. For example, one VM can be allocated 3 GPU processors, another VM can be allocated 10, a third VM can be allocated 150, etc. (assuming, of course, that the GPU processors can be individually programmed).

From the perspective of a software developer, a GPU is a computational device that is capable of performing identical mathematical operations in parallel, on a very large number of data streams. If the same program performs the same exact operations for different data, then a corresponding part of that program can be performed on the GPU. In effect, the GPU functions as a co-processor for the CPU. This principle is used by the exemplary embodiment that adopts the GPUs for serving the VMs implemented on a host computer system.

Use of GPUs by the VM of the exemplary embodiments is supported by the computer unified device architecture (CUDA) released by NVidia. Unlike first generation graphics processors, CUDA permits working not only with floating point numbers, but also with integer type data.

Depending on the capabilities of the GPU and depending on how efficiently a particular algorithm is implemented, performing the calculations in a GPU permits an increase in speed on the order of 10-50 times. At the moment, only GPUs sold by NVIDIA (GeForce 8-, 9- and 200-Series, Quadro FX cards and Tesla devices) are adapted for these functions, although it is expected that other graphics cards, from NVidia and other manufacturers, will soon also support these capabilities.

It will also be appreciated that the invention is not limited to NVidia chip sets and graphics and adapters from other 3D party manufacturers can also be used for the same purpose. For example, ATI graphics adapters, together with their CAL (compute abstraction layer) are also suitable for the VM, cryptographic, AV and other applications. Also, Intel's Larrabee graphics processor can be used for the VM applications described herein.

Additionally, the DirectX specification version 10 contemplates integer support and a unified shader model. Thus, the key insight here is that integer support on the processors of the GPU can be used to implement the basics of the VM processes. Also, the unified shader model permits the GPU to be programmed in a special language, which can also be adapted to complex calculations. Also, OpenGL/OpenCL can be used for similar purposes, such that the VM processes described herein can be distributed across platforms and across operating systems.

A modern GPU consists of a large number of processors, and represents a massively parallel machine. For example, the number of processors in GPU can be up to 128 (GeForce 8800 GTX and GeForce 8800 Ultra). The processors are combined into blocks of 8 processors, and each such block is referred to as a "multiprocessor." Each multiprocessor has its own set of registers, memory shared between the processors, and a cache for accelerated access to memory and to constants.

According to the exemplary embodiment, each multiprocessor or even a part of it can be used by a VM, while processes of other VM are executed in parallel on other multiprocessors.

In one embodiment, on a VM can be dedicated for performing security services (i.e., AV scans, firewalls, intrusion detection, etc.) for other VMs. In this case, the dedicated VM has to perform a large number of computation-intensive tasks, such as calculation of digital signatures and hashes. In particular, hash calculations put a large computational burden on the dedicated VM. Therefore, in the exemplary embodiment, all of these calculations are passed on to a GPU.

Many transformations and functions can be implemented quite efficiently on a GPU. In particular, algorithms employing 32-bit integer arithmetic that do not require a large amount of random access memory, are particularly well suited to being implemented on a graphics processor.

In one embodiment, a method for sharing a video card between the host OS and a number of Guest OSs using a VM hypervisor is provided. The proposed approach allows users to run applications from multiple guest OSs with a full acceleration on a single host system without dedication of a video card. Also it overcomes translation limitations of APIs. Most users have a single video card in their PC. In this case the video card is dedicated to a single OS. Such dedication requires support from a chipset (such as, for example, Intel VT-d/AMD IOMMU) and has a number of limitations.

A 3D virtualization of the exemplary embodiment allows to share host hardware and to avoid the overhead and problems presented by DirectX to OpenGL translation. As an example, DirectX to OpenGL translation may be performed by using the GPU data processing capabilities. Multiple video-cards are not required. This is made possible by having native graphics drivers explicitly support virtualization. The exemplary system provides an environment for communication between guest and host drivers. The 3D acceleration is handled by these drivers. A high level architecture for guest systems is illustrated in FIG. 1.

FIG. 1 illustrates a system architecture that provides communication channel between a guest system and a host system, including interrupt delivery, data transmission and guest system memory sharing. In the exemplary embodiment a guest video memory can be backed by a host system memory. It can also be mapped to a host physical address space (i.e., host graphics card PCI resources).

Alternatively, the exemplary embodiment can provide a suitable higher level communication API for a 3D party guest driver. A guest driver gateway runs as part of a VM. It receives commands from the guest driver and can generate events to it as needed. It also provides access to some host resource (i.e., GL texture) that represents a guest frame buffer and notifies the VM of the frame buffer changes.

The guest driver uses as much video memory as possible. It also needs to manage it (as in WDDM—Windows Display Driver Model). The host driver needs to be able to virtualize video memory. However, virtualization is done by DirectX at runtime and by the OpenGL. Thus, the exemplary embodiment works well with the existing drivers. Note that a number of context switches between the host and the guest should preferably be kept to a minimum (no more than a few times per frame), as the operation is quite expensive.

In another exemplary embodiment, some applications are off-loaded to be executed on a GPU instead of a CPU. According to the exemplary embodiment, users are able to run more applications simultaneously (i.e., in parallel) without having any limitations imposed by the CPU. Modern GPUs provide computing power that can be used for computation ability to execute any user-space application.

Figure 2:
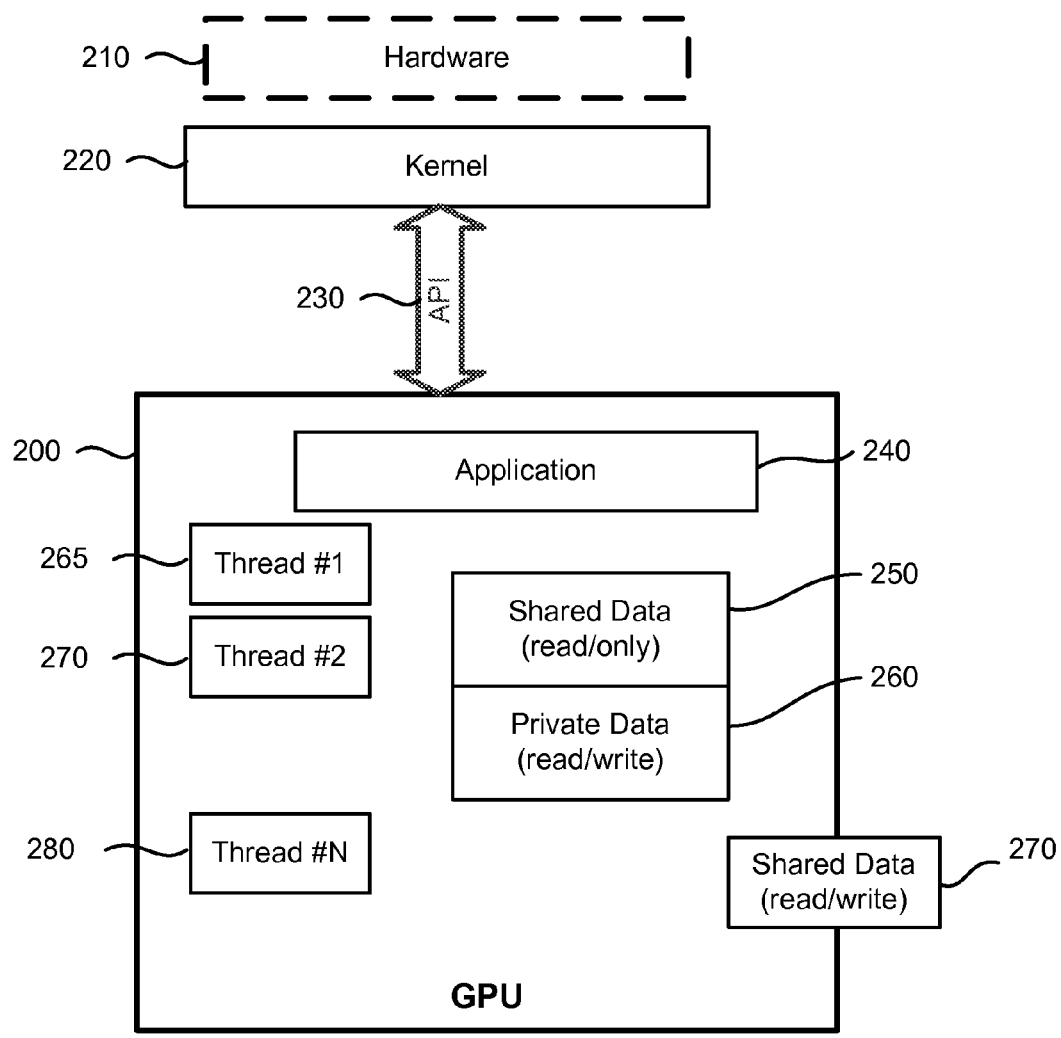
FIG. 2 illustrates an architecture for running applications on a GPU, in accordance with an exemplary embodiment.

A general architecture for running the VM applications on the GPU is illustrated in FIG. 2. The system hardware 210 works with OS kernel 220 that has a set of complex privileged instructions. The OS kernel 220 modifies physical/virtual translations and communicates with system hardware 210. The application(s) 240 have multiple threads 265, 270 and 280 with shared data. They operate using a simple set of instructions. The applications read and write to a private data 260 and read and execute from a shared data 250. Some applications also read/write from the shared data 270.

Applications 240 usually have multiple threads that share data. They operate on a simple instructions-set (i386 ISA is very complex in kernel, but user-space applications use only subset of it). The GPU 200 is almost fully separated from the Host OS. Therefore, it can run code (including privileged instructions) that can crash an execution environment without any substantial damage to the whole system. Applications 240 have a limited working set (usually 1-50 MB) and almost never use shared memory (with other applications) for write access.

In general, it will be appreciated that the code written for a particular CPU (for example, for the Intel family of processors) will not directly run on the GPU, since the GPU has a different instruction set. The VM code, therefore, needs to be translated into GPU code before being loaded into the GPU. Note that the code translation is normally not one-to-one, but often one CPU instruction is translated into several GPU instructions.

The GPU instructions are typically related to performing the following operations:
  sharing a video card;
  executing applications controlled by the hypervisor;
  creating snapshots of the OS;
  CRC calculations for memory ballooning;
  on-the-fly disk data encryption;
  indexing disk data;
  data compression for HDD;
  compression of the VM execution trace data and video traffic;
  computations for backup storage;
  AV scanning;
  firewall-related services;
  traffic encryption (IPSec);
  processing and restoration of disk transactions;
  creation and comparison of snapshots;
  traffic indexing and replay;
  isolation of applications on the GPU for virus protection; and
  optimization of runtime compilers.

Any privileged instructions in the guest OS/VM code either need to be emulated in the GPU (if possible), or replaced by an interrupt, and the VMM and/or hypervisor will have to address handling of that instruction. Additionally, the GPU does not normally work with RAM directly, but has its own memory and, optionally, cache. Translation, therefore, needs to take place between attempts to address RAM by the CPU code and the GPU memory.

The exemplary embodiment allows running any of i386 (for example) applications on the GPU. Most common multiprocessor systems today use multiprocessor architecture. In the case of multi-core processors, the symmetric multiprocessing (SMP) architecture applies to the cores, treating them as separate processors. In some cases, where a plurality of virtual processors is virtualized, a symmetric multiprocessing (SMP) memory pattern or Non-Uniform Memory Access (Non-Uniform Memory Architecture—NUMA) can be applied for multiprocessor computer architecture, where two or more identical processors can connect to a single shared main memory.

SMP systems allow any processor to work on any task regardless of where the data for that task is located in memory. SMP systems can easily move tasks between processors to balance the workload efficiently.

Also, the proposed system has an ability to execute a set of native instructions (i.e., a functional equivalent to non-privileged IA-32 (e) instruction set). The GPU of the exemplary embodiment can control memory management unit (MMU) (i.e., present and non-present pages and page fault handling number).

According to the exemplary embodiment, parallel stream processing can also be used for connecting multiple remote devices to one server over TCP (e.g., USB devices having fast joining and splitting flows). Also, video card hardware and software logic can be used for the processing of the TCP stack. The TCP stack overflow is undesirable in fast TCP connections.

The GPU may participate in distributed calculations in the local computing system commonly with local CPU and in cooperation with remote CPU(s) and GPU(s). Tasks proposed for GPU usage may be used by a single GPU, e.g., with single or multi-core processor or by GPU as a part of the distributed computing system described above.

The GPU can also be used for routing. The TCP stack processing routine can be executed on the GPU. The GPU programmable logic can be used as a part of a USB transmitting protocol (for example, as a memory buffer or a like). The GPU can efficiently process streaming data. It can emulate USB devices and network applications. It can also emulate third-party video cards.

The GPU can perform calculations for a fast comparison (on a hardware level) of the common view of multiple overlapping 3D objects. This can be used for virus detection using fuzzy logic or a like due to a wide range of transformation abilities of the hardware. Multiple parallel streams can be set up, for example, each thread comparing one virus signature. Similarly, multiple streams can be set up to perform other security functions, such as firewall, anti-spam, etc. The streams can belong each to a single VM, or multiple streams can be associated with one VM, etc.

In one embodiment, the GPU can be used for efficient detection of identical files and pages for sharing them among isolated containers. Also, an address space of the GPU can be used as a system memory for bypassing unsafe or potentially unsafe instructions without analyzing (i.e., calculating) whether the instructions are really unsafe.

In yet another embodiment, the GPU can be used for antivirus processing of the VM and for intrusion detection. It can be used for detecting and disabling viruses and rootkits that can infect and disable AV applications. In a typical situation, when an AV scan is performed, for example, a signature scan is initiated on the OS, a special signature scanning API is employed. If the virus or rootkit is already embedded in the operating system and can intercept API requests and can hide itself even inside the AV module. Therefore, the signature scanning API cannot detect a signature of the virus since it is hidden from the AV module.

This problem is solved by the exemplary embodiment using a VM and a GPU. The AV application is launched in one OS, while AV protection is provided for another OS or OSes. One of the OSes may be a host OS while other OS(es) may run on the VM. In an exemplary embodiment, an AV module can run on the reduced Host OS where a hypervisor or other VM support means runs.

In this case, when a virus attempts to infect a computer system via the guest OS, the AV application running on the host OS can employ the scanning API that is outside guest OS and is not visible to the virus and can see the signature of the virus or rootkit. Thus, the virus can be terminated without employing any means of the guest OS.

If a Host OS of the computer system is already infected or even has failed, it can be migrated into the VM, on the same computing system where the host OS that is free from the malicious software is mounted. An AV (antivirus) scanning module can be installed and launched either on the Host OS or on the VM from where infected software can be accessed. In one exemplary embodiment, the OS with AV module can be launched on the video card unit.

Alternatively, the former Host OS may be migrated to the VM and run on the video card. A snapshot (hibernation file) of the Host OS can be used or the OS can be migrated from the VM running on the physical machine that owns the video card or on another physical machine. Some methods for migration of the Host OS into VM are described in the application U.S. patent application Ser. No. 11/348,382; Filed: Feb. 7, 2006, entitled SYSTEM AND METHOD FOR STARTING VIRTUAL MACHINE MONITOR IN COMMON WITH ALREADY INSTALLED OPERATING SYSTEM, incorporated herein by reference in its entirety. As another example, a Virtual Machine with AV module can be implemented on the GPU for detecting and deleting malicious software from infected Host OS.

Alternatively, OS components can be used (such as, for example, embedded IT components). Also, some of the workload can be off-loaded to the GPU. The OS commands can be emulated inside the GPU. After the OS is isolated inside the VM, the host OS can be launched for an AV check. The virus signatures are visible on the host OS since the virus cannot mask them using the guest OS. The AV application can be executed on the CPU as well.

According to the exemplary embodiment, a fast protection of the Host OS without a need to emulate or translate instructions of the AV code is provided. It is possible to run the AV on the same hardware without a risk of extracting malicious code into the AV.

Since a file system of a former host OS is mounted outside the host OS the AV can only see data on the current host OS at a block level. The files of the VM file system can be presented in a special (non-standard) manner. In this case, an API interface that is not included in a standard set of VM APIs can be used. Thus, the virus cannot intercept AV calls to the VM file system.

Hash values of virus signatures that cannot be found on disk by conventional means can be found and accessed on the disk at the block level. A dedicated host OS with protected areas can be also used for protection of the VMs and containers. The dedicated OS is protected from being reconfigured. Changes and reconfigurations are only allowed when updates are installed. The protected OS can be effectively used against the rootkits. The rootkit scan can be easily detected on the protected OS since the AV does not use a standard API susceptible to the rootkits attacks. Furthermore, the rootkit AV check can be performed from the outside, from the host OS running on another machine.

In yet another embodiment, a Virtual Desktop Infrastructure (VDI) can be implemented using the GPU. The desktop is implemented on a server and is provided to a client. When a desktop image is loaded to a client, the image is converted from one format to another. Loading and converting a large desktop image with applications data embedded within it requires powerful processors. It can be implemented by the GPU. The GPU can process TCP stack, it can also pack and unpack data. The GPU can also be used for joining and separating the snapshots.

Compiler-related code can also be executed on the GPU. The compiler is a set of programs that translate source code from a high-level programming language to a lower level language (e.g., assembly language or machine code). The compiler is likely to perform many or all of the following operations: lexical analysis, preprocessing, parsing, semantic analysis, code generation, and code optimization. All of these computationally intensive operations that require processing significant streams of data can be performed on the VM by using the GPU computational resources.

Other applications of the preferred embodiment can include hash/CRC calculation for memory sharing (across VMs), and archiving/packing VM state or suspend/resume/snapshot. Executable code related to the following operation can be off-loaded to the GPU: creation and management of virtual machines within the computer system; optimization of code distribution among different VMs within the computer system; performance and resource optimization; dynamic management of virtual resources through the VMs; support of communication channels between the VMs and hardware modules of the computer system; data compression; data and traffic encryption; binary translation; code optimization; deduplication; hardware data retrieval; mathematical calculations; graphical data processing; backup and restoration of data; antivirus processing; firewall support; support for trusted execution technology, etc.

According to the exemplary embodiment, code related to emulation of hardware devices that process data streams can be executed on the GPU. Generally VM code can be analyzed in order to determine effectiveness of its execution on the GPU. For example, the code that takes up a lot of resource due to transferring large amounts of data is not going to be efficiently executed on the GPU.

However, the code that deals with relatively modest amounts of data, but performs a large volume of computationally intensive tasks, can be efficiently executed on the GPU. According to the exemplary embodiment, the VM code or portions of code can be determined for execution on GPU by a number of privileged instructions (e.g., VMM exits triggered by this code). Generally, ideal code for offloading to the GPU is one that has no privileged instructions, and can run entirely natively, since any privileged instructions will require intervention by the VMM (and, therefore, reduce the efficiency of using the GPU). As such, the objective is to find such portions of guest code that have no (or relatively small) number of privileged instructions. Absence (or a small number) of these instructions within the code can be used as a criteria for off-loading code execution to the GPU. External profiles can be used for analysis of the native code, in order to determine if the code (or portions thereof) can be effectively executed in the GPU. Also, the VMM can have a priori knowledge that certain portions of guest code are suitable for GPU operations. The analysis of the suitability of the code for performing on the GPU can be performed by the VMM, by a standalone software module, by a module in a sandbox, by a module within the VMM, etc.

In order to off-load the code (or portions thereof) to the GPU, a starting point of the code within the VM is determined. Alternatively, a starting address of the code can be defined by a global off-set value.

Alternatively, the instructions can be selected for execution on the GPU by using CPU counters that detect computationally intensive or cyclical portions of code (i.e., a current CPU load). Typically, the GPU driver dynamically allocates its core processors for execution of a particular task based on a current load of each processor. However, some of the GPU processors can be allocated (statically or on-the-fly) to serve certain VMs or groups of the VMs.

Figure 3:
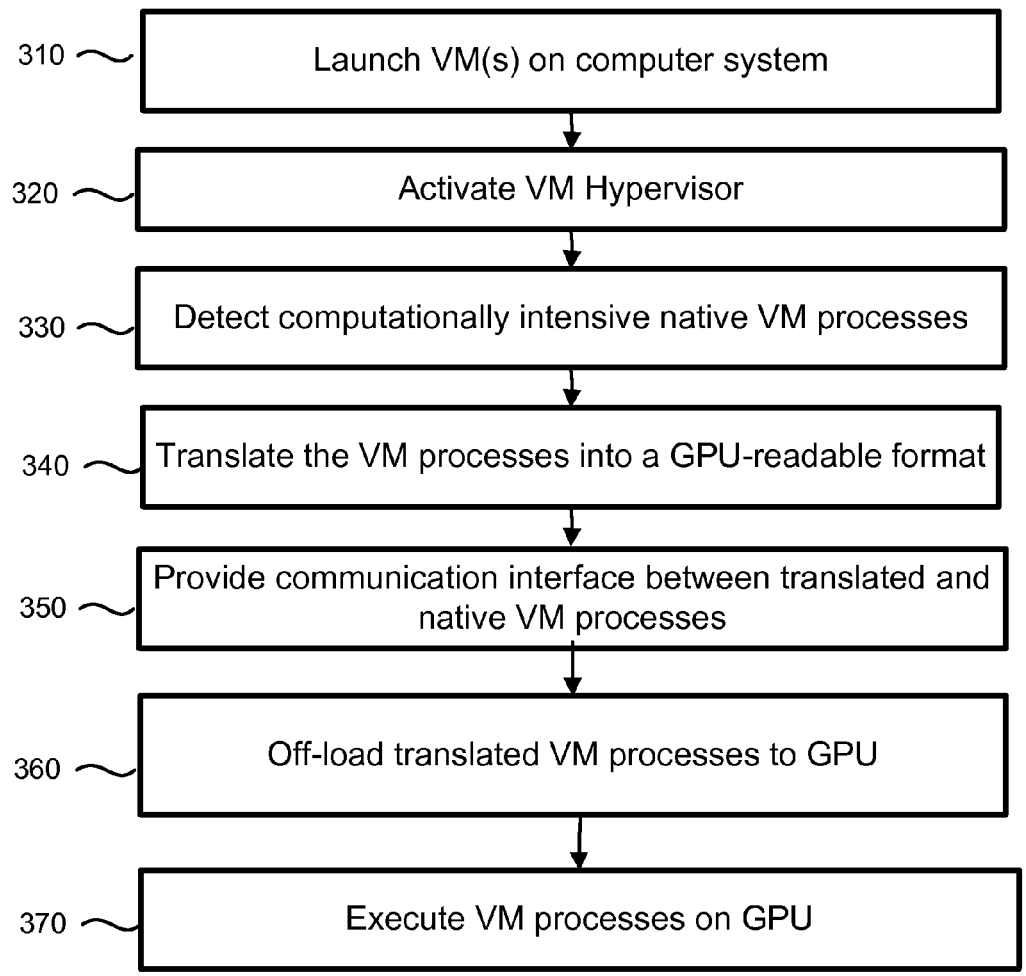
FIG. 3 illustrates a flowchart of a method for using GPU for performing computational tasks required by VM applications, in accordance with an exemplary embodiment.

FIG. 3 illustrates a flowchart of a method for using GPU for performing computational tasks required by VM applications, in accordance with an exemplary embodiment. A VM (or several VMs) are launched on a computer system in step 310. A VM hypervisor is activated for controlling the native VM applications in step 320. Computationally intensive VM processes are detected by VMM in step 330. The VM processes are translated into a GPU-readable format in step 340. A communication interface between the translated and the native VM processes is provided in step 350. Then, in step 360, the translated VM processes are off-loaded to the GPU of the computer system. The VM processes are executed in GPU is step 370.

Figure 4:
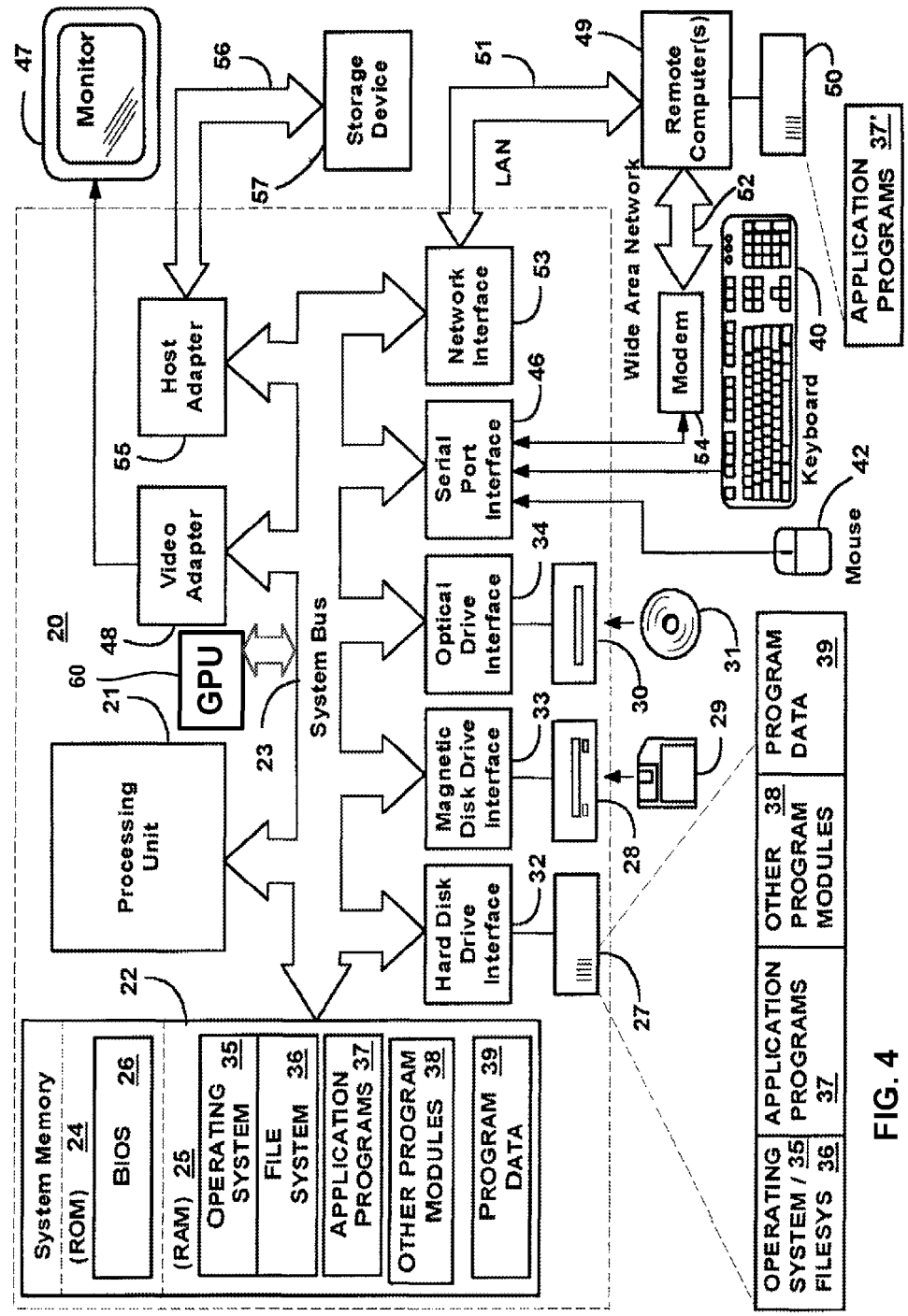
FIG. 4 illustrates a schematic of an exemplary computer system on which the invention can be implemented.

With reference to FIG. 4, an exemplary system for implementing the invention includes a general purpose computing device in the form of a computer or server 20 or the like, including a processing unit 21, a system memory 22, and a system bus 23 that couples various system components including the system memory to the processing unit 21.

The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help transfer information between elements within the computer 20, such as during start-up, is stored in ROM 24.

The computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM, DVD-ROM or other optical media.

The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the computer 20.

Although the exemplary environment described herein employs a hard disk, a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35. The computer 20 includes a file system 36 associated with or included within the operating system 35, one or more application programs 37, other program modules 38 and program data 39. A user may enter commands and information into the computer 20 through input devices such as a keyboard 40 and pointing device 42. Other input devices (not shown) may include a microphone, joystick, game pad, satellite dish, scanner or the like.

These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to a video adapter 48 that includes the GPU. The video adapter in dedicated graphic card solution is connected to the system bus 23 via an interface such as PCI or AGP or PCI interfaces controlled by chipset of the motherboard. PCI (part of the PCI Local Bus standard and often shortened to PCI) is a computer bus for attaching hardware devices in a computer. These devices can take either the form of an integrated circuit fitted onto the motherboard itself, called a planar device in the PCI specification, or an expansion card that fits into a slot. The Accelerated Graphics Port (often shortened to AGP) is a high-speed point-to-point channel for attaching a video card to a computer's motherboard. PCI Express (Peripheral Component Interconnect Express), officially abbreviated as PCIe (or PCI-E, as it is commonly called), is a computer expansion card standard designed to replace the older PCI, PCI-X, and AGP standards. PCIe 2.1 is the latest standard for expansion cards that is available on mainstream personal computers. All of these can be used to interface to the GPU. Also other types of GPU connection or coupling to the system bus may be used in the invention. E.g. integrated graphics solutions may be used where integrated GPU utilizes a portion of a computer's system RAM rather than dedicated graphics memory over the system bus.

In addition to the monitor 47, personal computers typically include other peripheral output devices (not shown), such as speakers and printers.

The computer 20 may operate in a networked environment using logical connections to one or more remote computers 49. The remote computer (or computers) 49 may be another computer, a server, a router, a network PC, a peer device or other common network node, and typically includes many or all of the elements described above relative to the computer 20, although only a memory storage device 50 has been illustrated. The logical connections include a local area network (LAN) 51 and a wide area network (WAN) 52. Such networking environments are commonplace in offices, enterprise-wide computer networks, Intranets and the Internet.

When used in a LAN networking environment, the computer 20 is connected to the local network 51 through a network interface or adapter 53. When used in a WAN networking environment, the computer 20 typically includes a modem 54 or other means for establishing communications over the wide area network 52, such as the Internet.

The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing a communications link between the computers may be used.

Having thus described a preferred embodiment, it should be apparent to those skilled in the art that certain advantages of the described method and apparatus have been achieved. In particular, those skilled in the art would appreciate that the proposed system and method provide for support and acceleration of the VMs by a GPU.

It should also be appreciated that various modifications, adaptations and alternative embodiments thereof may be made within the scope and spirit of the present invention. The invention is further defined by the following claims.

What is claimed is:

1. A method for using a Graphical Processing Unit (GPU) for supporting a Virtual Machine (VM) on a computer having a Central Processing Unit (CPU) and the GPU, the method comprising:
   launching at least one VM on the CPU with support from a Virtual Machine Monitor (VMM) on a computer system;
   detecting, by the VMM, executable native CPU instructions corresponding to VM processes within the VM applications;
   translating, by the VMM, the detected native CPU instructions into a GPU-executable format with GPU instructions;
   providing a communication interface between an execution environment native to the detected CPU instructions and the translated code executed on the GPU;
   off-loading the translated VM CPU instructions to the GPU of the computer system;
   executing the VM processes, that would otherwise execute on the CPU, on the GPU; and
   providing results from the GPU to the VM using translation functions of the communication interface.

2. The method of claim 1, wherein the native CPU instructions have a starting point within the VM.

3. The method of claim 1, wherein a sub-routine of the native CPU instructions have a starting point within the VM.

4. The method of claim 1, wherein the native CPU instructions have a starting address defined by a global off-set.

5. The method of claim 1, further comprising estimating a current CPU load and off-loading the VM code to the GPU based on the current CPU load.

6. The method of claim 1, wherein the VM processes relate to any of:
   sharing a video card;
   executing applications controlled by the hypervisor;
   creating snapshots of the OS;
   CRC calculations for memory ballooning;
   on-the-fly disk data encryption;
   indexing disk data;
   data compression for HDD;
   compression of the VM execution trace data and video traffic;
   computations for backup storage;
   AV scanning;
   firewall-related services;
   traffic encryption (IPSec);
   processing and restoration of disk transactions;
   creation and comparison of snapshots;
   traffic indexing and replay;
   isolation of applications on the GPU for virus protection; and
   optimization of runtime compilers.

7. A system for employing a GPU in a virtual environment, the system comprising:
   a computer system having a CPU, a GPU in communication with the CPU and a memory coupled to the CPU;
   at least one Virtual Machine (VM) implemented on the computer system;
   a plurality of applications running on the VM;
   at least one VMM supporting the VM,
   an application available for either CPU execution or GPU execution, the application comprising a plurality of CPU instructions;
   wherein the VMM controls the application such that the application may be executed either on the CPU or on the GPU, transparently to the VM, and
   wherein, if the application is executed on the GPU, the VMM converts CPU instructions into GPU instructions.

8. The system of claim 7, wherein the application code is translated for GPU or CPU execution.

9. The system of claim 8, wherein source code of the application is translated.

10. The system of claim 7, wherein the application is a part of the VMM or hypervisor.

11. The system of claim 7, wherein the application executable on the CPU contains GPU executable code.

12. The system of claim 7, wherein the VMM translates source code of the means for supporting virtualization to the GPU specific code.

13. The system of claim 7, wherein the VMM comprises means for supporting virtualization for any of:
- creation and management of virtual machines within the computer system;
- optimization of code distribution among different VMs within the computer system;
- performance and resource optimization;
- dynamic management of virtual resources through the VMs;
- support of communication channels between the VMs and hardware modules of the computer system;
- data compression;
- data and traffic encryption;
- binary translation;
- code optimization;
- deduplication;
- hardware data retrieval;
- mathematical calculations;
- graphical data processing;
- backup and restoration of data;
- antivirus processing;
- firewall support; and
- support for trusted execution technology.

14. The system of claim 7, wherein the means for supporting virtualization emulates hardware devices that process data streams.

15. The system of claim 7, wherein the means for supporting virtualization is selected based on an absence of VMM exits triggered by execution of the CPU instructions.

16. A system for employing a GPU in a virtual environment, the system comprising:
- a computer system having a system bus, a CPU coupled to the system bus, a GPU coupled to the CPU and a memory coupled to the CPU;
- a Virtual Machine Monitor (VMM) implemented at a system level;
- at least one Virtual Machine (VM) implemented on the computer system and running guest code comprising CPU instructions;
- wherein the VMM analyzes the CPU instructions for suitability for execution on the GPU, translates at least some of the CPU instructions into a format suitable for GPU execution and moves the at least some of the translated CPU instructions to the GPU for execution.

17. The system of claim 16, wherein the CPU instructions executed on the GPU relates to antivirus detection.

18. The system of claim 16, wherein the CPU instructions executed on the GPU relates multimedia compression or decompression.

* * * * *

UNITED STATES PATENT AND TRADEMARK OFFICE
CERTIFICATE OF CORRECTION

PATENT NO. : 8,938,723 B1  
APPLICATION NO. : 12/849689  
DATED : January 20, 2015  
INVENTOR(S) : Alexander G. Tormasov et al.

Page 1 of 2

It is certified that error appears in the above-identified patent and that said Letters Patent is hereby corrected as shown below:

In the Claims

In column 12, lines 23-43, claim 6 should read as follows:
6. The method of claim 1, wherein the VM processes relate to any of:
sharing a video card;
executing applications controlled by the hypervisor;
creating snapshots of an operating system;
CRC calculations for memory ballooning;
on-the-fly disk data encryption;
indexing disk data;
data compression for hard disk drive (HDD);
compression of the VM execution trace data and video traffic;
computations for backup storage;
antivirus (AV) scanning;
firewall-related services;
traffic encryption (IPSec);
processing and restoration of disk transactions;
creation and comparison of snapshots;
traffic indexing and replay;
isolation of applications on the GPU for virus protection; and
optimization of runtime compilers.

In column 13, lines 1-3, claim 12 should read as follows:
12. The system of claim 7, wherein the VMM translates source code of means for supporting virtualization to the GPU specific code.

Signed and Sealed this  
Fourteenth Day of April, 2015

Michelle K. Lee  
*Director of the United States Patent and Trademark Office*

CERTIFICATE OF CORRECTION (continued)
U.S. Pat. No. 8,938,723 B1

In column 14, lines 1-6, claims 14 and 15 should read as follows:

14. The system of claim 13, wherein the means for supporting virtualization emulates hardware devices that process data streams.

15. The system of claim 13, wherein the means for supporting virtualization is selected based on an absence of VMEXITs triggered by execution of the CPU instructions.

In column 14, lines 21-26, claims 17 and 18 should read as follows:

17. The system of claim 16, wherein the CPU instructions executed on the GPU relate to antivirus detection.

18. The system of claim 16, wherein the CPU instructions executed on the GPU relate to multimedia compression or decompression.